US012497548B2

United States Patent
Wilker et al.

(10) Patent No.: US 12,497,548 B2
(45) Date of Patent: Dec. 16, 2025

(54) BIOMIMETIC POLYMER ADHESIVES CONTAINING GALLOL GROUPS

(71) Applicant: Purdue Research Foundation, West Lafayette, IN (US)

(72) Inventors: Jonathan J. Wilker, West Lafayette, IN (US); Nevin A. Naren, Los Angeles, CA (US); Tuhin Subhra Pal, West Bengal (IN)

(73) Assignee: Purdue Research Foundation, West Lafayette, IN (US)

( * ) Notice: Subject to any disclaimer, the term of this patent is extended or adjusted under 35 U.S.C. 154(b) by 467 days.

(21) Appl. No.: 18/128,691

(22) Filed: Mar. 30, 2023

(65) Prior Publication Data

US 2023/0383150 A1 Nov. 30, 2023

Related U.S. Application Data

(60) Provisional application No. 63/347,320, filed on May 31, 2022.

(51) Int. Cl.
  *C09J 125/18* (2006.01)
  *C08F 212/14* (2006.01)
(52) U.S. Cl.
  CPC .......... *C09J 125/18* (2013.01); *C08F 212/22* (2020.02)
(58) Field of Classification Search
  None
  See application file for complete search history.

(56) References Cited

PUBLICATIONS

Yu, et al. "Effect of molecular weight and polymer composition on gallol-functionalized underwater adhesive", Journal of Materials Chemistry B, 8, 6798-6801, Apr. 8, 2020. (Year: 2020).*
Yu, et al, Electronic Supplementary Material for Yu "Effect of molecular weight and polymer composition on gallol-functionalized underwater adhesive", Apr. 8, 2020. (Year: 2020).*
Ahn, B.K., "Perspectives on Mussel-Inspired Wet Adhesion," J. Am. Chem. Soc., 139, (2017), (6 pages).
Alfieri, M.L. et al., "The Chemistry of Polydopamine Film Formation: The Amine-Quinone Interplay," Biomimetics, 3, 26, (2018), (11 pages).
Badhani, B et al., "Gallic Acid: A Versatile Antioxidant with Promising Therapeutic and Industrial Applications," RSC Adv., 5, (2015), (18 pages).
Cheng, B et al., "Ultrastrong Underwater Adhesion on Diverse Substrates Using Non-Canonical Phenolic Groups," Nature Communications, 13:1892, (2022), (9 pages).
Cristescu, R et al., "Thin Films of Polymer Mimics of Cross-Linking Mussel Adhesive Proteins Deposited by Matrix Assisted Pulsed Laser Evaporation," Applied Surface Science, 255, (2009), (3 pages).

Fan, H et al., "Tannic Acid-Based Multifunctional Hydrogels with Facile Adjustable Adhesion and Cohesion Contributed by Polyphenol Supramolecular Chemistry," ACS Omega, 2, (2017), (9 pages).
Guo, Q et al., "Recent Progress in Synthesis and Application of Mussel-Inspired Adhesives," Nanoscale, 12, (2020), (18 pages).
Han, N et al., "A Fe3+-Crosslinked Pyrogallol-Tethered Gelatin Adhesive Hydrogel with Antibacterial Activity for Wound Healing†," Biomater. Sci., 8, (2020), (9 pages).
Heo, J et al., "Improved Performance of Protected Catecholic Polysiloxanes for Bioinspired Wet Adhesion to Surface Oxides," Am. Chem. Soc., 134, (2012), (7 pages).
Ju, J et al., "Addressing the Shortcomings of Polyphenol-Derived Adhesives: Achievement of Long Shelf Life for Effective Hemostasis," ACS Appl. Mater. Interfaces, 14, (2022), (11 pages).
Kambourakis, S et al., "Synthesis of Gallic Acid and Pyrogallol from Glucose: Replacing Natural Product Isolation with Microbial Catalysis," J. Am. Chem. Soc., 122, (2000), (2 pages).
Kim, S et al., "Gallol Containing Adhesive Polymers," Journal of Macromolecular Science, Part A, 59: 10, (2022), (22 pages).
Lancelot, A et al., "Increasing the Scale and Decreasing the Cost of Making a Catechol-Containing Adhesive Polymer," Macromolecules, 56, (2023), (13 pages).
Lee, S.Y. et al., "Tunicate-Inspired Polyallylamine-Based Hydrogels for Wet Adhesion: A Comparative Study of Catechol- and Gallol-Functionalities," Journal of Colloid and Interface Science, 601, (2021), (13 pages).
Leibig, D et al., "Anionic Polymerization of Vinylcatechol Derivatives: Reversal of the Monomer Gradient Directed by the Position of the Catechol Moiety in the Copolymerization with Styrene," Macromolecules, 49, (2016), (10 pages).
Li, L et al., "Helical Poly(N-Propargylamide)s with Functional Catechol Groups: Synthesis and Adsorption of Metal Ions in Aqueous Solution," Reactive & Functional Polymers, 70, (2010), (6 pages).
Liu, Y et al., "Preparation of Renewable Gallic Acid-Based Self-Healing Waterborne Polyurethane with Dynamic Phenol-Carbamate Network: Toward Superior Mechanical Properties and Shape Memory Function," J Mater Sci, 57, (2022), (18 pages).
Mazzotta, M et al., "Weak Bonds in a Biomimetic Adhesive Enhance Toughness and Performance," J. Am. Chem. Soc., 142, (2020), (7 pages).
Meredith H.J. et al., "Enhancing the Adhesion of a Biomimetic Polymer Yields Performance Rivaling Commercial Glues," Adv. Funct. Mater, 24, (2014), (10 pages).
Matos-Perez, C et al., "Polymer Composition and Substrate Influences on the Adhesive Bonding of a Biomimetic, Cross-Linking Polymer," J. Am. Chem. Soc., 134, (2012), (8 pages).
Mishra A.K. et al., "Gallol-Based Block Copolymer with a High Flory-Huggins Interaction Parameter for Next-Generation Lithography," Macromolecules, 55, (2022), (7 pages).

(Continued)

*Primary Examiner* — Christopher M Rodd
(74) *Attorney, Agent, or Firm* — Purdue Research Foundation (57) ABSTRACT

A biomimetic polymer adhesive comprising a poly (gallol-co-styrene) group, its use in dry and wet (e.g., underwater) adhesion, and its method of manufacturing.

9 Claims, 6 Drawing Sheets

(56) References Cited

PUBLICATIONS

North, M.A. et al., "High Strength Underwater Bonding with Polymer Mimics of Mussel Adhesive Proteins," ACS Appl. Mater. Interfaces, (2017), 9, (7 pages).

Oh, D et al., "Tunicate-Mimetic Nanofibrous Hydrogel Adhesive with Improved Wet Adhesion," Acta Biomaterialia, 20, (2015), (9 pages).

Prateek, D et al., "Biomimetic Polymer Adhesives," ACS Appl. Polym. Mater, 4, (2022), (21 pages).

Saiz-Poseu, J et al., "The Chemistry Behind Catechol-Based Adhesion," Angew. Chem. Intl. Ed., 58, (2019), (19 pages).

Seo, S et al., "Microphase Behavior and Enhanced Wet-Cohesion of Synthetic Copolyampholytes Inspired by a Mussel Foot Protein," J. Am. Chem. Soc., 137, (2015) (4 pages).

Shin, M et al., "Gallol-Rich Hyaluronic Acid Hydrogels: Shear-Thinning, Protein Accumulation Against Concentration Gradients, and Degradation-Resistant Properties," Chem. Mater., (2017), (10 pages).

Shin, M et al., "Plant-Inspired Pyrogallol-Containing Functional Materials," Adv. Funct. Mater., 29, 1903022, (2019), (27 pages).

Takeshima, H et al., "Scalable Synthesis of Bio-Based Functional Styrene: Protected Vinyl Catechol from Caffeic Acid and Controlled Radical and Anionic Polymerizations Thereof," ACS Sustainable Chem. Eng. 6, (2018), (6 pages).

Taylor, J et al., "Influences of Phosphates on the Adhesion of a Catechol-Containing Polymer," ACS Appl. Polym. Mater. 2, (2020), (8 pages).

Waite, H "Adhesion à La Moule" Integr. Comp. Biol., 42, (2002), (9 pages).

Wang, Y et al., "Biologically Inspired Materials Exhibiting Repeatable Regeneration with Self-Sealing Capabilities Without External Stimuli or Catalysts," Adv. Mater., 28, (2016), (8 pages).

White, J et al., "Underwater Bonding with Charged Polymer Mimics of Marine Mussel Adhesive Proteins," Macromoleculess, 44 (2011), (4 pages).

Wolfel, A et al., "Unraveling the Gallol-Driven Assembly Mechanism of Thermoreversible Supramolecular Hydrogels Inspired by Ascidians," Polym. Chem., 11, (2020), (14 pages).

Xu, L.Q. et al., "Antifouling Coatings of Catecholamine Copolymers on Stainless Steel," Ind. Eng. Chem. Res., 54, (2015), (9 pages).

Yang, N. et al., "Gallol-Based Constant Underwater Coating Adhesives for Severe Aqueous Conditions," Colloids and Surfaces A: Physicochemical and Engineering Aspects, 634, 127948, (2022), (8 pages).

Yang, Q et al., "A Bioinspired Gallol-Functionalized Collagen As Wet-Tissue Adhesive for Biomedical Applications," Chemical Engineering Journal, 417, 127962, (2021), (13 pages).

Yu, J. et al., "Effect of Molecular Weight and Polymer Composition on Gallol-Functionalized Underwater Adhesive," J. Mater. Chem. B., 8, (2020), (4 pages).

Zahrani, N et al., "Recent Developments of Gallic Acid Derivatives and Their Hybrids in Medicinal Chemistry: A Review," European Journal of Medicinal Chemistry, 204, 112609, (2020), (37 pages).

Zhan, K et al., "Antioxidant and Adsorption Properties of Bioinspired Phenolic Polymers: A Comparative Study of Catechol and Gallol," ACS Sustainable Chem. Eng., 4, (2016), (7 pages).

Zhan, K et al., "Tunicate-Inspired Gallol Polymers for Underwater Adhesive: A Comparative Study of Catechol and Gallol," Biomacromolecules, 18, (2017), (8 pages).

Zhang, C et al., "Reversible Adhesive Based on Gallic Acid Modified Acrylate," International Journal of Adhesion and Adhesives, 90, (2019), (6 pages).

Zhang, M et al., "Adhesive, Antibacterial, Conductive, Anti-UV, Self-Healing, and Tough Collagen-Based Hydrogels from a Pyrogallol-Ag Self-Catalysis System," ACS Appl. Mater. Inferfaces, 14, (2022), (15 pages).

Zuo, L et al., "An Efficient Method for Demethylation of Aryl Methyl Ethers," Tetrahedron Letters, 49, (2008), (3 pages).

\* cited by examiner

BIOMIMETIC POLYMER ADHESIVES CONTAINING GALLOL GROUPS

CROSS-REFERENCE TO RELATED APPLICATION

This application claims priority to U.S. provisional patent application No. 63/347,320, which was filed May 31, 2022, and which is hereby incorporated by reference in its entirety.

STATEMENT OF GOVERNMENT SUPPORT

This invention was made with government support under N00014-19-1-2342 and N00014-22-1-2408 awarded by the Office of Naval Research. The government has certain rights in the invention.

TECHNICAL FIELD

The present disclosure relates to biomimetic polymer adhesives containing gallol groups and their use. The present disclosure also relates to a method of manufacturing biomimetic polymer adhesives containing gallol groups.

BACKGROUND

This section introduces aspects that may help facilitate a better understanding of the disclosure. Accordingly, these statements are to be read in this light and are not to be understood as admissions about what is or is not prior art.

The creation of underwater adhesives inspired by marine mussels is important for bonding in wet environments, including several biomedical and industrial applications. Mussel has an extremely strong ability to stick, and the adhesion protein of its secretion can be attached on nearly all base material. Mussel adhesive proteins contain pendant catechol groups in the form of the amino acid 3,4-dihydroxy-phenylalanine (DOPA) and gallol in the form of amino acid 3,4,5-trihydroxyphenylalanine (TOPA) for cross-linking and well-established adhesion chemistry. Thus, several biomimetic adhesives have focused on the inclusion of catechol chemistry. Such proteins represent a great challenge for commercial production and field applications in terms of synthetic difficulty and cost.

Such a functional group can be considered a subtype of phenols. More broadly, polyphenols are often plant-derived chemicals with two or more phenolic groups. Antioxidant activity, adsorption on universal substrates, and biocompatibility have generated interest in these compounds. Many polyphenols include gallol groups (i.e., trihydroxyphenyl) in their chemical structure. Despite the small difference in chemical structure, gallol-containing adhesive polymers show higher wet adhesion properties than catechol-containing adhesives under identical experimental conditions.

Thus, there is an unmet need to develop a potential alternative to catechol chemistry and provide a robust biomimetic polymer adhesive. It is an object of the present disclosure to provide such an alternative to catechol chemistry. This and other objects and advantages, as well as inventive features, will be apparent from the detailed description.

SUMMARY

Provided is a polymer adhesive comprising (i) a first gallol-containing monomer 3,4,5-trihydroxy-styrene and (ii) a second monomer styrene, wherein the amount of the gallol present is about 15% to about 50% of the polymer. The molecular weight of the polymer adhesive is about 5,000 g/mol to about 500,000 g/mol.

In some embodiments, the amount of the gallol present is preferably about 15% to about 30% of the polymer. In some embodiments, the molecular weight of polymer adhesive is preferably about 45,000 g/mol to about 195,000 g/mol.

Provided is a method of manufacturing a gallol-containing polymer adhesive. The method comprises the steps:
(i) mixing a dispersant and a surfactant in the presence of a solvent;
(ii) mixing a styrene monomer with 3,4,5-trialkoxy styrene monomer;
(iii) adding an initiator to the mixture of monomers of step (ii);
(iv) adding the initiator-monomer mixture of step (iii) to the mixture of step (i) to form monomer droplets;
(v) allowing a polymerization reaction in the monomer droplets under continuous stirring;
(vi) quenching the polymerization reaction to obtain 3,4,5-trialkoxy styrene-co-styrene; and
(vii) hydrolyzing the 3,4,5-trialkoxy styrene-co-styrene to obtain the gallol-containing polymer.

The styrene monomer can be protected with an alkoxy group wherein the alkoxy group is selected from methoxy, ethoxy, and silyloxy.

The dispersant and surfactant can be mixed in a suitable solvent. In some embodiments, the solvent can be water. The dispersant and surfactant can be used in a ratio of about 2%:4% or about 4%:2%. The dispersant can be selected from polyvinyl alcohol (PVA), modified PVA, polyvinylpyrrolidine (PVP), and hydroxylpropylmethyl cellulose. Preferably, the dispersant is PVA. The surfactant can be any suitable surfactant. In some embodiments, the surfactant can be sodium dodecyl sulfate.

Examples of the initiator include, but are not limited to, dibenzoyl peroxide (BPO), tert-butyl peroxide, diacetyl peroxide, lauroyl peroxide, dicumyl peroxide, 2,2'-azobisizobutyronitrile (AIBN), 2,2'-azobis(2-methylpropionitrile), 2,2'-azobis(2-methyl butyronitrile), or a combination of two or more thereof. In some embodiments, the initiator can be BPO or AIBN.

Further provided is a polymer adhesive composition comprising (i) a first gallol-containing monomer 3,4,5-trihydroxy-styrene, (ii) a second monomer styrene, wherein the amount of the gallol present is about 15% to about 50% of the polymer adhesive, and (iii) an organic solvent.

In some embodiments, the organic solvent is selected from acetone, chloroform, dichloromethane, acetonitrile, N,N dimethylformamide, and dimethylsulfoxide.

BRIEF DESCRIPTION OF THE DRAWINGS

The present disclosure will be more readily understood from the detailed description of embodiments presented below, considered in conjunction with the attached drawings of which.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

The terms "polymer adhesive," "polymer," and "adhesive" are used interchangeably.

Gallol is a member of the phenolic family. Polyphenols are often plant-derived chemicals with two or more phenolic groups. They exhibit excellent antioxidant activity, adsorption on universal substrates, and biocompatibility. Many plant-derived polyphenols include gallol groups (i.e., trihydroxyphenyl) in their chemical structure containing three adjacent hydroxy groups attached to the benzene ring. Examples of polyphenols that comprise the gallol group include, but are not limited to, gallic acid, tannic acid, epigallocatechin, ellagitannin, raspberry ellagitannin, and flavonoids. The suitable polyphenol can be gallic acid. The gallol group has a higher binding affinity to proteins or metal ions and a higher antioxidant capacity than the catechol group. It shows higher wet adhesion properties than catechol.

In view of the above, the present disclosure provides a polymer adhesive comprising (i) a first gallol-containing monomer 3,4,5-trihydroxy-styrene and (ii) a second monomer styrene, wherein the amount of the gallol present is about 15% to about 50% of the polymer adhesive.

In some embodiments, the polymer adhesive is a gallol-containing polymer adhesive. In some embodiments, the gallol-containing polymer adhesive is poly[(3,4,5-trihydroxystyrene)-co-styrene] (poly(gallol-co-styrene)), wherein the amount of the gallol present is about 15% to about 50% of the polymer.

The pendent gallol group, which is 3,4,5-trihydroxy-styrene, can be distributed throughout a polymer backbone with various content of the gallol groups. The styrene monomer used can be substituted or unsubstituted.

In some embodiments, the amount of the gallol present in the gallol-containing polymer adhesive can be about 15% to about 50% of the polymer adhesive, preferably about 15% to about 30% of the polymer adhesive. In some embodiments, the amount of styrene in the polymer adhesive can be about 50% to about 85% of the polymer adhesive, such as about 70% to about 85% of the polymer adhesive.

The molecular weight of poly(gallol-co-styrene) (PGS) can be about 500,000 g/mol or less. In some embodiments, the molecular weight of the polymer can range from about 5,000 g/mol to about 500,000 g/mol. Preferably, the molecular weight can range from about 45,000 g/mol to about 195,000 g/mol. In some embodiments, the number average molecular weight (Mn) can range from about 10,000 g/mol to about 150,000 g/mol, such as from about 13,000 g/mol to about 135,000 g/mol.

In some embodiments, the polydispersity index (PDI) of a PGS can be about 1.0 to about 4.0, such as about 1.4 to about 3.5.

The polymer adhesive disclosed herein can work in a dry environment, underwater, or on wet surfaces. Usually, the adhesives that work in dry environments do not work when applied underwater or on wet surfaces. It is well-known in the art that dry adhesives do not show strong bonding underwater or on wet surfaces.

Suspension polymerization can be employed to produce a gallol-containing polymer adhesive at an industrial scale in a repetitive and reproducible pattern. The method has several benefits for commercial production, including the use of water as the primary solvent, control over polymer molecular weight, and ease of polymer cleanup.

Provided is a method of manufacturing a gallol-containing polymer adhesive. The method comprises a suspension polymerization. Suspension polymerization can comprise a radical polymerization inside droplets of monomer, which are dispersed in a liquid phase, in which one or more monomers, a final polymer, and an initiator are not soluble. The monomer droplets can act as small reactors all over the liquid phase and thus can act as reservoirs to supply the growing particles with monomers and surfactant species. The final polymer can be obtained in the form of polymer beads.

In some embodiments, the method comprises the following steps:
(i) mixing a dispersant and a surfactant in the presence of a solvent;
(ii) mixing a styrene monomer with 3,4,5-trialkoxy styrene monomer;
(iii) adding an initiator to the mixture of monomers of step (ii);
(iv) adding the initiator-monomer mixture of step (iii) to the mixture of step (i) to form monomer droplets;
(v) allowing a polymerization reaction in the monomer droplets under continuous stirring;
(vi) quenching the polymerization reaction to obtain 3,4,5-trialkoxy styrene-co-styrene; and
(vii) hydrolyzing the 3,4,5-trialkoxy styrene-co-styrene to obtain the gallol-containing polymer.

In some embodiments, the gallol-containing polymer is poly[(3,4,5-trihydroxystyrene)-co-styrene] (poly(gallol-co-styrene)), wherein the amount of the gallol present is about 15% to about 50% of the polymer. The gallol-containing polymer can act as an adhesive.

The styrene monomer can be mixed with a protected styrene monomer, for example, 3,4,5-trialkoxy styrene monomer. The hydroxy group can be protected by a suitable alkoxy group. Examples of the alkoxy group include, but are not limited to, methoxy, ethoxy, or silyloxy. In some embodiments, the protected 3,4,5-trialkoxy styrene monomer is 3,4,5-trimethoxy styrene monomer.

The dispersant and surfactant can be used in a ratio of about 2%:4% to about 4%:2%.

The solvent used for suspension polymerization can be any suitable solvent. Examples of the solvent include, but are not limited to, water, toluene, or a combination thereof. In some embodiments, the solvent is water.

Dispersants can be used to disperse monomers in the liquid phase. The dispersant can be selected from polyvinyl alcohol (PVA), modified PVA, polyvinylpyrrolidine (PVP), and hydroxylpropylemthyl cellulose (HPMC). Preferably, the dispersant is PVA. Surfactants used can be any suitable surfactant used in emulsions or suspension polymerizations. Preferably, the surfactant is sodium dodecyl sulfate.

Initiator used for a radical polymerization can be 2,2,6,6-tetramethyl-1-piperidinyloxy (TEMPO) for a nitroxide-mediated radical initiation; an arenesulfonyl chloride with a metal catalyst or an alkyl halide with a transition metal catalyst for atom transfer radical addition polymerization (ATRP); a reversible addition-fragmentation chain transfer (RAFT) agent or ultraviolet (UV) light. In some embodiments, radical polymerization is a free radical polymerization.

An initiator for a free radical polymerization is selected from dibenzoyl peroxide (BPO), tert-butyl peroxide, diacetyl peroxide, lauroyl peroxide, dicumyl peroxide, 2,2'-azobisizobutyronitrile (AIBN), 2,2'-azobis(2-methylpropionitrile), 2,2'-azobis(2-methyl butyronitrile), or a combination of two or more thereof. Preferably, the initiator is BPO or AIBN.

3,4,5-trimethoxy styrene can be used as a monomer since methoxy groups provide protection to phenolic groups. Phenolic groups can act as radical scavengers and thus need to be protected during radical polymerization. While methoxy groups can undergo H-abstraction in polymerization reactions, the resulting increase in molecular weight distribution can have a positive effect on adhesion by providing both shorter polymer chains for surface interactions and longer chains for crosslinking and bulk cohesion.

The stirring of the reaction mixture is critical in suspension polymerization. The average molecular weight of the resulting polymer can be changed by increasing or decreasing the stirring speed of the reaction. Lower stirring speed can increase the suspended droplet size and the resulting polymer chain length. In contrast, the higher stirring speed can decrease the suspended droplet size and the resulting polymer chain length. The dispersity of the resulting polymer can be controlled by adjusting the stirring during the polymerization.

Molecular weight can have a major impact upon adhesion, with shorter chains providing surface wetting yet longer molecules being best at bringing about polymer-polymer interactions for cohesion. The molecular weight of polymer adhesive can vary by changing the initiator for polymerization (see Tables 1, 2, and 3).

The polymer adhesive can have optimal adhesion when the amount of gallol present is about 16% to about 24% of the polymer, such as about 16% to 24% of the polymer, 16% to about 24% of the polymer, or 16% to 24% of the polymer.

This poly(gallol-co-styrene) (PGS) adhesive can be used both in a dry environment and a wet environment, including a damp environment and an underwater environment. The bonding characteristics of the adhesives were examined in both underwater and dry environments. Both surface bonding and bulk cohesion were studied. The adhesion strength of PGS was compared to the adhesion strength of poly (catechol-co-styrene) (PCS) manufactured by the method described herein above. The adhesion strength of PGS adhesive was tested by lap shear test both in dry and underwater and compared with the adhesion strengths of PCS (see FIGS. 3a, 3b, 4a, and 4b). PGS with 16% of gallol content shows higher adhesion strength than PCS with 16% catechol content under both dry and underwater environments.

The water used for underwater environment testing can be seawater or fresh water. The substrates can be submerged underwater during the application of polymer adhesive or after the application.

Provided is a polymer adhesive composition comprising (i) a first gallol-containing monomer 3,4,5-trihydroxy-styrene, (ii) a second monomer styrene, wherein the amount of the gallol present is about 15% to about 50% of the polymer, and (iii) an organic solvent.

The polymer adhesive composition can be used in a solution form. The polymer adhesive can be dissolved in an organic solvent. The organic solvents can be any suitable solvent that is denser than the water such that the polymer adhesive does not float up and off the substrate. Preferably, the organic solvent is selected from acetone, chloroform, acetonitrile, dichloromethane, N, N dimethylformamide, and dimethylsulfoxide.

This polymer solution can be deposited onto both substrates separately, and the substrates can be overlapped to form a single lap shear joint. Samples can be cured for about 1 hr to about 24 hrs, such as about 1 hr to 24 hrs, 1 hr to about 24 hrs, or 1 hr to 24 hrs. The samples can be cured at a temperature of about room temperature to about 150° C., such as about room temperature to 150° C., room temperature to about 150° C., or room temperature to 150° C. For under-seawater bonding adhesion tests, all of the substrates can be placed into a seawater bath, and the samples were cured for about 1 day to about 3 days, such as about 1 day to 3 days, 1 day to about 3 days, or 1 day to 3 days.

Figure 4A:
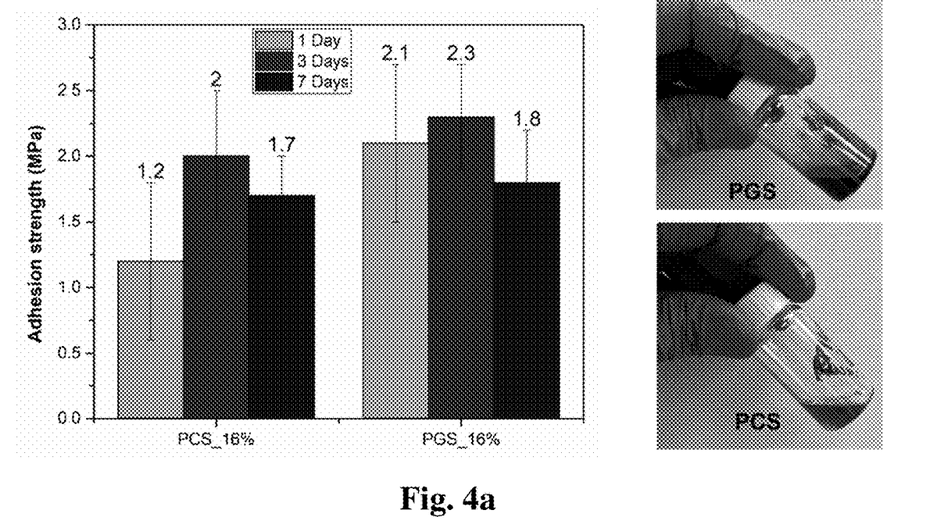
FIG. 4a shows the adhesion strength (MPa) of PCS (16% of catechol) vs. PGS (16% of gallol) underwater for one day, three days, and seven days.
Figure 4B:
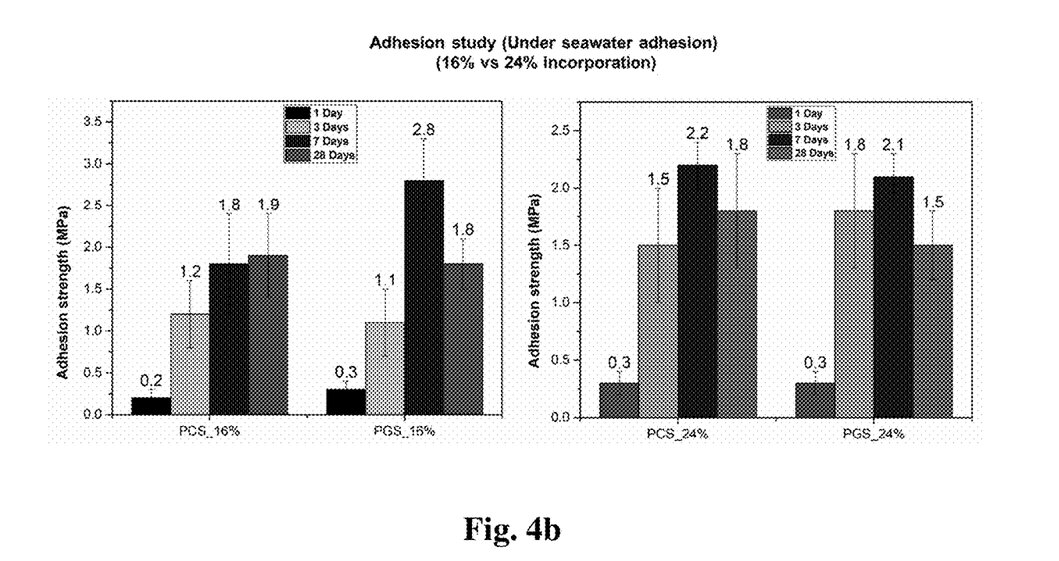
FIG. 4b shows the adhesion performance under seawater for one day, three days, seven days, and twenty-eight days for PCS vs. PGS containing 16% and 24% of catechol and gallol, respectively.

The underwater, specifically under seawater, bonding strength of both PGS and PCS was tested for one day up to twenty-eight days for different amounts of the gallol and catechol (see FIGS. 4a and 4b). Higher bonding strengths were seen after 3 days, 7 days, and 28 days, respectively. After 7 days, PGS containing 16% gallol content showed higher bonding with an adhesion strength of 2.8 MPa than PCS containing 16% catechol content with an adhesion strength of 1.8 MPa (see FIG. 4b).

Figure 3A:
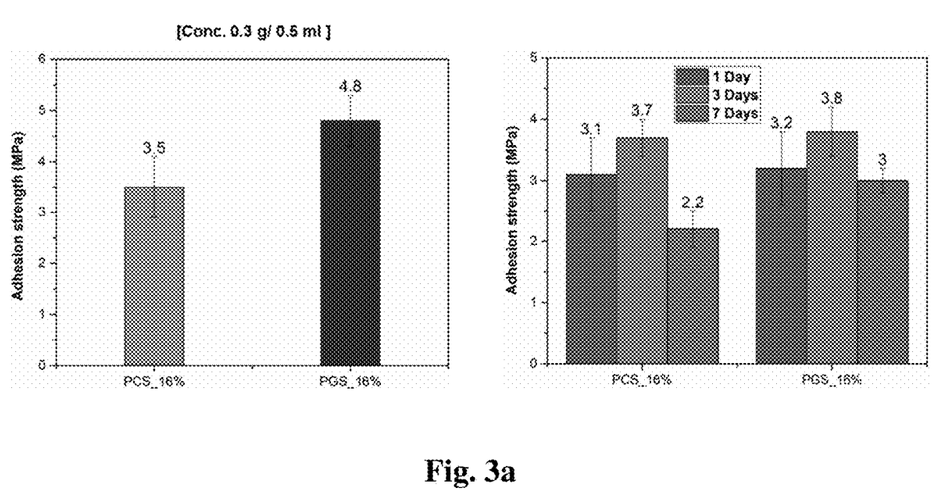
FIG. 3a shows the adhesion strength (MPa) of PCS (16% of catechol) vs. PGS (16% of gallol) in the dry environment for one day, three days, and seven days.
Figure 3B:
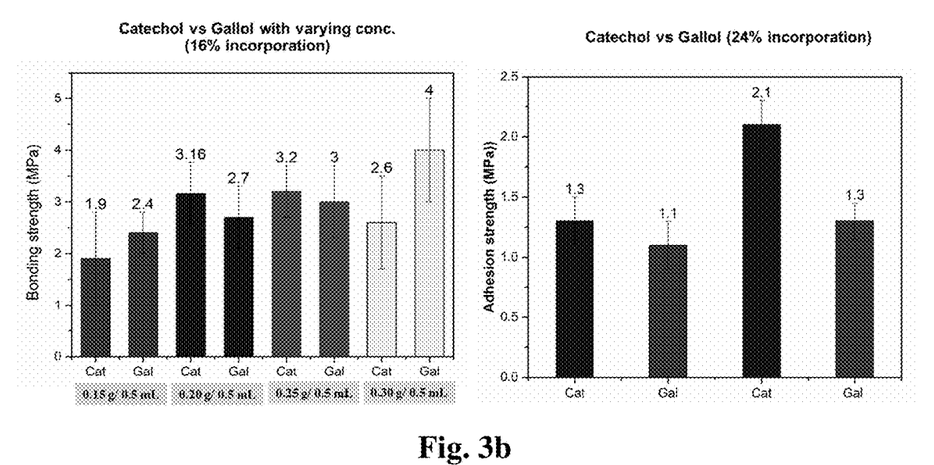
FIG. 3b shows the adhesion strength (MPa) in the dry environment of PCS vs. PGS with varying concentrations of catechol and gallol.

FIG. 3a shows the higher dry adhesion strength of PGS (16% gallol content), with an adhesion strength of 4.8 MPa, than that of PCS (16% catechol content), with an adhesion strength of 3.5 MPa. FIG. 3b shows that PGS with various concentrations of gallol has high bonding and adhesion strength compared to PCS in a dry environment.

Bonding strengths of PUS on a variety of substrates, ranging from low energy to high energy, were tested. These substrates exhibit a range of surface energies, roughness, and industrial applications. Smooth plastic surfaces can be challenging for good adhesion. The substrate can be any suitable substrate. The examples of the substrates include, but are not limited to, polished aluminium, American Society for Testing and Materials (ASTM) grade aluminium, polyvinyl chloride (PVC), and polyterafluoroethylene (PTFE).

Figure 5:
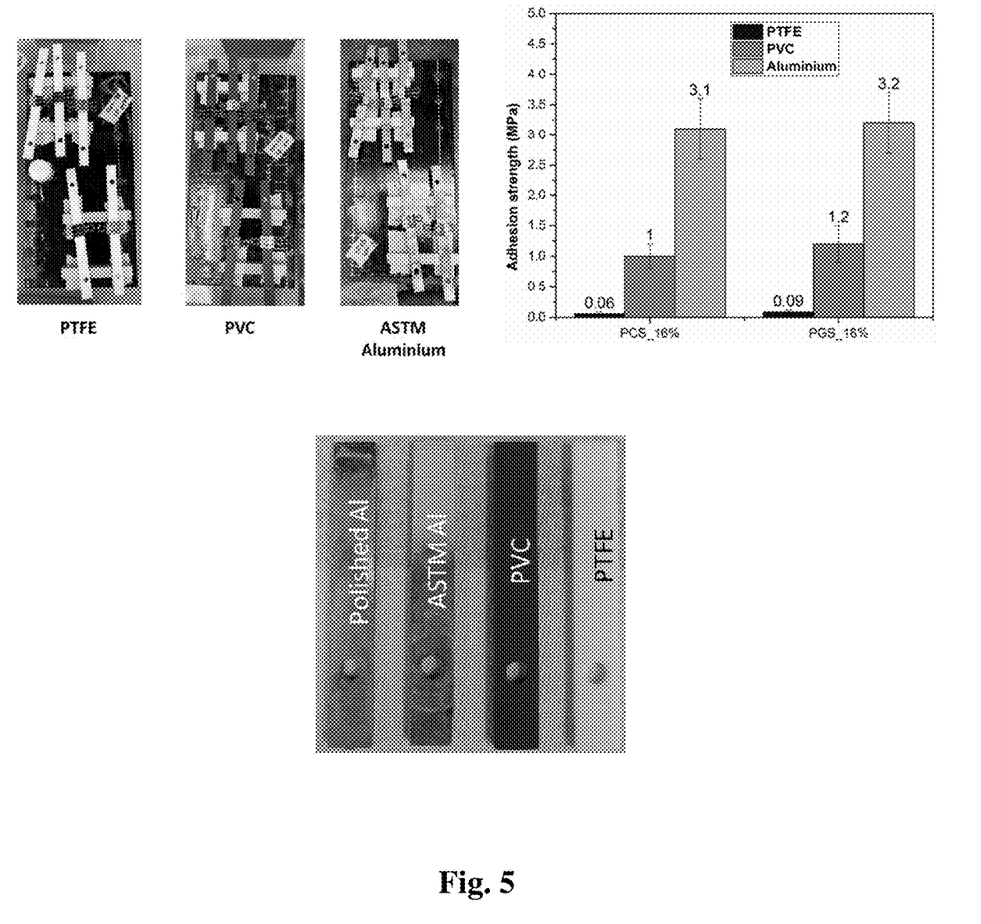
FIG. 5 shows the adhesion performance of PCS vs. PGS on different substrates such as polyterafluoroethylene (PTFE), polyvinyl chloride (PVC), and aluminium.

Polymer adhesives showed the strongest adhesion on aluminium surfaces (FIG. 5). Aluminium provided the strongest bonding strength for PGS because of the strong coordination between the surface and adhesives. The PGS also showed good adhesion to the most challenging, low-fouling substrates under dry conditions, including PVC and PTFE.

Figure 6:
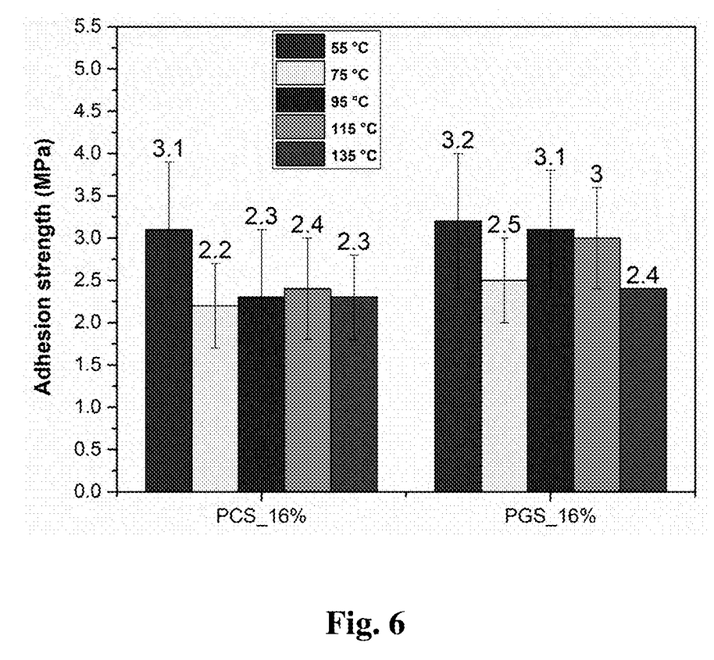
FIG. 6 shows the temperature dependence adhesion towards aluminium for PCS (16% of catechol) vs. PGS (16% of gallol). The adhesion strength was tested at various temperature ranges from about 55° C. to about 135° C.

The effect of curing time on bonding strength (dry) was investigated. The bonding strength of PCS (16% catechol content) in dry conditions decreased as the curing time proceeded, and the highest bonding strength at 3.1 MPa was found at 55° C. (see FIG. 6). A similar trend was observed for the PGS (16% gallol content).

EXAMPLES

Materials
methyl triphenyl-phosphonium bromide (Sigma Aldrich)
3,4,5 trimethoxy-benzaldehyde (TCI Chemicals)

COMPARATIVE EXAMPLE

Synthesis of poly[(3,4-dihydroxystyrene)-co-styrene]/[poly(catechol-co-styrene)]

Scheme-1
Synthesis of poly[3,4-dihydroxystyrene)-co-styrene]/[poly(catechol-co-styrene)]

1-(3,4-Dimethoxyphenyl)ethan-1-ol 3,4-dimethoxyacetophenone (40.0 g, 223 mmol, 1.00 eq.) was dissolved into anhydrous methanol (250 mL) under argon atmosphere and cooled down to 0° C. Sodium borohydride (10.13 g, 267 mmol, 1.20 eq.) was added to the reaction mixture in portions. Hydrogen gas bubbling was observed. The reaction mixture was stirred under argon atmosphere until reaction completion (ca. 3 hours). A diluted $H_2SO_4$ solution, 2 M, was added dropwise to the reaction mixture at 0° C. until reaching acidic pH ($\approx$2-3). Boron salt precipitation was observed. Water (400 mL) was poured into the reaction mixture. The product was extracted three times with dichloromethane (1×200 mL, 2×150 mL). The organic phase was dried over anhydrous $MgSO_4$, and the solvent evaporated under a vacuum to get a colorless oil (38.2 g, 96%).

$^1$H NMR ($CDCl_3$, 300 MHz): δ (ppm) 6.95-6.80 (m, 3H, $H_{Ar}$), 4.86 (q, J=6.5 Hz, 1H, —C$\underline{H}$(OH)—$CH_3$), 3.91-3.85 (m, 6H, —OC$\underline{H}_3$), 1.75 (bs, 1H, —O$\underline{H}$), 1.48 (d, J=6.5 Hz, 3H, —CH(OH)—C$\underline{H}_3$).

$^{13}$C NMR ($CDCl_3$, 75 MHz): δ (ppm) 148.1, 147.4, 138.0, 116.8, 110.3, 108.0, 69.3, 55.3, 55.2, 24.5.

3,4-Dimethoxystyrene 1-(3,4-Dimethoxyphenyl)ethan-1-ol (35.0 g, 182 mmol, 1.00 eq.) was dissolved into N,N-dimethylformamide (230 mL). Aluminium chloride (1.28 g, 9.61 mmol, 0.05 eq.) and triphenylphosphine (2.52 g, 9.61 mmol, 0.05 eq.) were added to the mixture. The mixture was stirred at 80° C. After reaction completion (ca. 24 hours), the mixture was cooled down to room temperature. Water (1,000 mL) was poured into the reaction. The product was extracted three times with diethyl ether (1×400 mL, 2×300 mL). The organic phase was washed with brine three time (1×300 mL, 2×200 mL), dried over anhydrous $MgSO_4$ and the solvent was evaporated under vacuum to yield a light-yellow oil (30.8 g, 88%).

$^1$H NMR ($CDCl_3$, 300 MHz): δ (ppm) 6.95-6.76 (m, 3H, $H_{Ar}$), 6.63 (dd, J=10.9, 17.6 Hz, 1H, Ph-C$\underline{H}$=$CH_2$), 5.59 (d, J=17.6 Hz, 1H, Ph-CH=C$\underline{H}_2$), 5.12 (d, J=10.8, 1H, Ph-CH=C$\underline{H}_2$), 3.90-3.82 (m, 6H, —OC$\underline{H}_3$).

$^{13}$C NMR ($CDCl_3$, 75 MHz): δ (ppm) 148.8, 148.7, 136.3, 130.4, 119.3, 111.6, 110.8, 108.3, 55.8, 55.7.

Poly(3,4-dimethoxystyrene-co-styrene)

An argon-degassed aqueous solution of poly(vinyl alcohol) (4%$_w$) and sodium dodecyl sulfate (2%$_w$) (200 mL) was poured into a 1,000 mL three-angled neck round bottom flask. Styrene (24.0 mL, 211 mmol, 0.83 eq.) and 3,4-dimethoxystyrene (7.0 mL, 43.5 mmol, 0.17 eq.) were mixed in a beaker. Benzoyl peroxide (0.38 g, 1.56 mmol, 1.37%$_w$) was dissolved into the monomer mixture. The BPO-monomers mixture was then poured into the round bottom flask. This polymerization reaction was stirred using an overhead mechanical stirrer equipped with a half-moon PTFE stirring blade (56×19 mm) at 90° C. for 24 hours under an argon atmosphere. The reaction was cooled down to room temperature, and the polymer precipitated into methanol (2,800 mL) and was left to settle overnight. The polymer was recovered by filtration, washed with methanol, and dried to give a white powder (20.9 g, 72%).

$^1$H NMR ($CDCl_3$, 300 MHz): δ (ppm) 7.07 (m, 2.28H, $^3H_{Ar-styr}$), 6.58 (m, 1.76H, 2$H_{Ar-styr}$+1$H_{Ar-dms}$), 6.00 (m, 0.48H, 2H$_{Ar\text{-}styr}$), 3.80-3.61 (m, 1.41H, —OC$\underline{H}_3$), 1.81 (m, 1H, —C$\underline{H}$Ph-CH$_2$—), 1.42 (m, 2H, —CHPh-C$\underline{H}_2$—).

Poly(catechol-co-styrene) (PCS)

Poly(3,4-dimethoxystyrene-co-styrene) (10.00 g, 20.2 mmol of methoxy monomer, 1.00 eq.) was dissolved in N,N-dimethylformamide (70 mL) by being stirred at 70° C. for 1 hour. Iodocyclohexane (25 mL, 194 mmol, 9.6 eq.) was added to the mixture. The reaction was stirred at 145 C for 24 hours. The solution was then cooled to room temperature and precipitated into an aqueous solution of sodium metabisulfite (30%, 1,500 mL) and stirred for 1 hour. The solid was recovered after decanting, dissolved into acetone (300 mL), precipitated into water (1,500 mL) and stirred for 1 hour. Again, the solid was recovered after decanting, dissolved into acetone (300 mL), precipitated into hexanes (1,500 mL) and, stirred for 1 hour. Once more, the solid was recovered after decanting, dissolved into acetone (350 mL), filtered through glass wool, precipitated into hexanes (1,500 mL) and stirred for 1 hour, and left to settle overnight. The polymer was recovered after decantation, and the remaining entrapped solvent was evaporated under a vacuum. The solid was crushed to yield a powder light brown powder (7.6 g, 76%).

$^1$H NMR (CDCl$_3$, 300 MHz): δ (ppm) 7.07 (m, 2.28H, 3H$_{Ar\text{-}styr}$), 6.58 (m, 1.76H, 2H$_{Ar\text{-}styr}$+1H$_{Ar\text{-}cat}$), 6.00 (m, 0.48H, 2H$_{Ar\text{-}scat}$), 1.78 (m, 1H, —C$\underline{H}$Ph-CH$_2$—), 1.44 (m, 2H, —CHPh-C$\underline{H}_2$—).

EXAMPLE

Synthesis of poly[(3,4,5-trihydroxystyrene)-co-styrene]/poly(gallol-co-styrene)

poly(gallol-$^{co}$-styrene)

Synthesis of 3,4,5-Trimethoxystyrene

Example 1

Under an atmosphere of argon at 0° C., 7.14 mL (15 mmol) of n-butyllithium (2.1 M in hexanes) was added dropwise to a suspension of 4.73 g (13.2 mmol) of methyl triphenyl-phosphonium bromide, in 50 mL of dry THF. After the reaction mixture was warmed to room temperature, 2 g (10 mmol) of 3,4,5 trimethoxy-benzaldehyde was added. The resulting orange solution was stirred overnight and then poured into 100 mL of water, extracted with ether, dried over MgSO4, filtered, evaporated to yield a yellowish oily product.

Example 2

Under an atmosphere of argon at 0° C., 30.00 mL (76.25 mmol) of n-butyllithium (2.1 M in hexanes) was added dropwise to a suspension of 24.04 g (67.3 mmol) of methyl triphenyl-phosphonium bromide, in 50 mL of dry THF After the reaction mixture was warmed to room temperature, 10.00 g (50.96 mmol) of 3,4,5 trimethoxy-benzaldehyde was added. The resulting orange solution was stirred overnight and then poured into 100 mL of water, extracted with ether, dried over MgSO4, filtered, evaporated, and purified by column chromatography (silica, 4:1 hexane:ethyl acetate) to yield a yellowish oily product (66%).

$^1$H NMR (400 MHz, CDCl3): (δ, ppm) 6.63 (s, 2H), 6.64 (dd, 1H, J=17.5 Hz, J'=10.8 Hz), 5.66 (dd, 1H, J=17.5 Hz, J'=0.8 Hz), 5.21 (dd, 1H, J=10.8 Hz, J'=0.8 Hz), 3.88 (s, 6H), 3.84 (s, 3H).

Poly(3,4,5-trimethoxystyrene-co-styrene)

An argon-degassed aqueous solution of poly(vinyl alcohol) (4%$_w$) and sodium dodecyl sulfate (2%$_w$) (200 mL) was poured into a 1,000 mL three-angled neck round bottom flask. Styrene (16.8 mL, 146.5 mmol, 0.74 eq.) and 3,4,5-trimethoxystyrene (10.0 mL, 51.4 mmol, 0.26 eq.) were mixed in a beaker. Benzoyl peroxide (0.33 g, 1.35 mmol, 1.37%$_w$) was dissolved into the monomer mixture. The BPO-monomers mixture was then poured into the round bottom flask. This polymerization reaction was stirred using an overhead mechanical stirrer equipped with a half-moon PTFE stirring blade (56×19 mm) at 90° C. for 24 hours under argon atmosphere. The reaction was cooled down to room temperature, and the polymer precipitated into methanol (2,800 mL) and was left to settle overnight. The polymer was recovered by filtration, washed with methanol, and dried to give a white powder (17.2 g, 68%).

$^1$H NMR (CDCl$_3$, 300 MHz): δ (ppm) 7.07 (m, 2.71H, 3H$_{Ar-styr}$), 6.58 (m, 1.74H, 2H$_{Ar-styr}$+1H$_{Ar-dms}$), 5.8 (m, 0.23H, 2H$_{Ar}$-styr), 3.80-3.61 (m, 1.44H, —OC$\underline{H}_3$), 1.81 (m, 1H, —C$\underline{H}$Ph-CH$_2$—), 1.42 (m, 2H, —CHPh-C$\underline{H}_2$—).

Synthesis of Poly(gallol-co-styrene) (PGS)

Poly(3,4,5-trimethoxystyrene-co-styrene) (10.00 g, 51.4 mmol of methoxy monomer, 1.00 eq.) was dissolved in N,N-dimethylformamide (70 mL) by being stirred at 70° C. for 1 hour. Iodocyclohexane (30 mL, 142 mmol, 9.6 eq.) was added to the mixture. The reaction was stirred at 145° C. for 24 hours. The solution was then cooled to room temperature and precipitated into an aqueous solution of sodium metabisulfite (30%, 1,500 mL) and stirred for 1 hour. The solid was recovered after decanting, dissolved into acetone (300 mL), precipitated into water (1,500 mL) and, stirred for 1 hour. Again, the solid was recovered after decanting, dissolved into acetone (300 mL), precipitated into hexanes (1,500 mL) and, stirred for 1 hour. Once more, the solid was recovered after decanting, dissolved into acetone (350 mL), filtered through glass wool, precipitated into hexanes (1,500 mL) and stirred for 1 hour and left to settle overnight. The polymer was recovered after decantation and the remaining entrapped solvent was evaporated under vacuum. The solid was crushed to yield a powder dark brown powder (6.7 g, 67%).

$^1$H NMR (CDCl$_3$, 300 MHz): δ (ppm) 7.0 (m, 2.28H, $^3$H$_{Ar-styr}$), 6.56 (m, 1.76H, 2H$_{Ar-styr}$+1H$_{Ar-gal}$), 5.89 (m, 0.48H, $^2$H$_{Ar-sgal}$), 1.82 (m, 1H, —C$\underline{H}$Ph-CH$_2$—), 1.46 (m, 2H, —CHPh-C$\underline{H}_2$—).

Characterization Methods:

The polymer PCS and PGS was characterized by various analytical techniques including NMR, Gel permeation chromatography (GPC), Size-exclusion chromatography (SEC), and Differential scanning calorimetry (DSC).

NMR Spectroscopy

The $^1$H and $^{13}$C NMR spectra were collected using a Varian Inova 300 MHz spectrometer employing deuterated chloroform (CDCl$_3$) as solvent. The chemical shifts are given in ppm relative to TMS and the coupling constants in Hz. The solvent residual peak was used for an internal standard.

GPC Analysis

GPC was performed on an Agilent 1260 infinity II GPC system equipped with two in series WAT044228 Styragel Waters columns. A refractive index detector was used to detect the samples at the end of the columns. The solvent, tetrahydrofuran, was used for eluent at a flow rate of 1 mL/min. Polystyrene standards were used for instrument calibration.

DSC Analysis (DSC) was performed on a Perkin Elmer DSC 4000 using a 5° C./min heating ramp going from 25 to 160° C.

Adhesion Testing:

Adhesive strength was initially determined using an Instron 5544 using a 2 kN load cell that was properly calibrated. The majority of samples tested breached the load cell capacity, so they were tested on an MTS Insight materials testing instrument with a 10 kN load cell. Samples for both the Instron and MTS were placed in the instrument using two steel crossbars to hold each adherend in place. The lap-shear joints were then pulled on the instrument using a pull rate of 2 mm/min. The force applied on the joints was recorded in Newtons (N). The resulting adhesive strength in units of megapascal (MPa) was calculated by dividing the force (N) and the resulting overlap area (mm$^2$).

Adhesion Tests (Lap Shear Tests):

Aluminium 6061 (8.89×1.27×0.318 cm$^3$) was used as a substrate material. Etched substrates were treated according to the ASTM D2651 standard method, followed by washes in boiling base and acid baths, methanol, and boiling deionized water. Polished substrates were prepared by using a buffing wheel with, first, a brown Tripoli rouge compound and, second, a green buffing compound, followed by washes in hexanes, acetone, methanol, and water.

Dry Adhesion:

For dry adhesion tests, the polymer was dissolved in acetone at a concentration of 0.3 g/mL. 30 μL of the polymer solution was deposited onto one substrate and 15 μL onto the other substrates using a positive displacement pipette. The substrates were overlapped (1.2×1.2 cm$^2$) to form a single lap shear joint. A weight of c.a. 20 g was placed onto the top of the joint. Samples were cured for 1 hr at room temperature followed by 22 hrs at 55° C. and then 1 hr at room temperature.

Under Seawater:

For under-seawater bonding, all of the substrates were placed into a seawater bath. The polymer was dissolved in chloroform at a concentration of 0.3 g/mL. Then, 45 μL of the polymer solution was deposited onto one of the submerged substrates using a positive displacement pipette, followed by 15 μL of chloroform (without polymer) on top of the polymer solution. The substrates, still underwater, were overlapped (1.2×1.2 cm$^2$) to form a single lap shear joint. A weight of c.a. 20 g was placed on top of the joint. Samples were cured for 1 or 3 days at room temperature or at 55° C. in the seawater bath. Lap shear adhesion forces were measured using a Instron. Substrates were pulled apart at a rate of 2 mm/min until the adhesive broke. The maximum force (N) required to break the adhesive joint was divided by the overlapping surface area (m$^2$) to give the adhesion strength (MPa). Each adhesion experiment was performed with 5 samples, and data were averaged.

Results:

Size-exclusion chromatography (SEC) was carried out in order to characterize the molecular weight of the synthesized copolymers. The molecular weight was obtained for the protected polymers. This approach prevented adhesion onto the high surface area SEC column. The SEC data in Table 1 and Table 2 indicate the molecular weight (Mw) and polydispersity indices (PDI) of copolymers when benzyl peroxide was used as an initiator for the polymerization. Table 3 indicates the Mw and PDI of copolymers when AIBN was used as an initiator for the polymerization.

TABLE 1

Copolymerization using BPO as an initiator for PCS

| Monomer Feed (%) | | SDS:PVA | Polymer observed (%) | | Yield | Mn | Mw | |
|---|---|---|---|---|---|---|---|---|
| 3,4-dimethoxystyrene | Styrene | (%) | 3,4-dimethoxystyrene | Styrene | (%) | (g/mol) | (g/mol) | PDI |
| 17 | 83 | 2:4 | ~16 | 84 | 67 | 30568 | 105132 | 3.4 |
| 25 | 75 | 2:4 | ~24 | 76 | 66 | 26623 | 89695 | 3.2 |

TABLE 2

Copolymerization using BPO as an initiator for PGS

| Monomer Feed (%) | | SDS:PVA | Polymer observed (%) | | Yield | Mn | Mw | |
|---|---|---|---|---|---|---|---|---|
| 3,4,5-trimethoxystyrene | Styrene | (%) | 3,4,5-trimethoxystyrene | Styrene | (%) | (g/mol) | (g/mol) | PDI |
| 26 | 74 | 2:4 | ~16 | 84 | 65 | 34987 | 83843 | 2.4 |
| 35 | 65 | 2:4 | ~24 | 76 | 62 | 13839 | 49329 | 3.5 |

TABLE 3

Copolymerization using AIBN as an initiator for PGS and PCS

| Monomer Feed (%) | | SDS:PVA | Polymer observed (%) | | | | |
|---|---|---|---|---|---|---|---|
| 3,4,5-trimethoxystyrene | Styrene | (%) | 3,4,5-trimethoxystyrene | Styrene | $M_n$ | $M_w$ | PDI |
| 35 (TSP128) | 65 | 2:4 | 16 | 84 | 134684 | 191475 | 1.4 |

| Monomer Feed (%) | | SDS:PVA | Polymer observed (%) | | | | |
|---|---|---|---|---|---|---|---|
| 3,4-dimethoxystyrene | Styrene | (%) | 3,4-dimethoxystyrene | Styrene | $M_n$ | $M_w$ | PDI |
| 17 (TSP142) | 83 | 2:4 | 16 | 84 | 119186 | 246897 | 2.1 |

Figure 1:
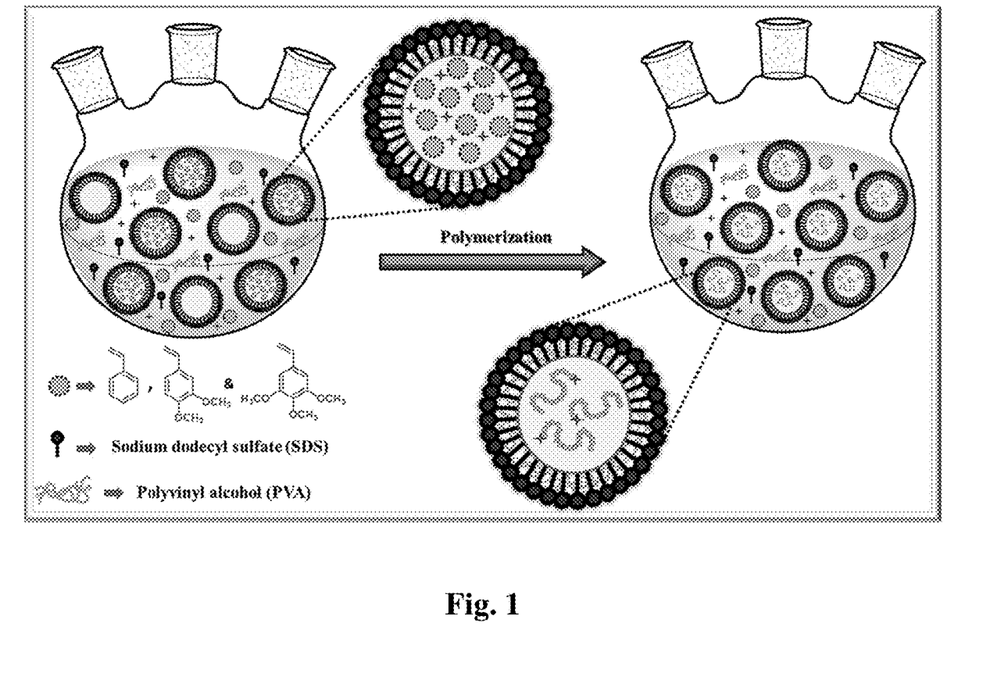
FIG. 1 shows the polymerization in the suspension of poly(catechol-co-styrene) (PCS) and poly(gallol-co-styrene) (PGS).
Figure 2A:
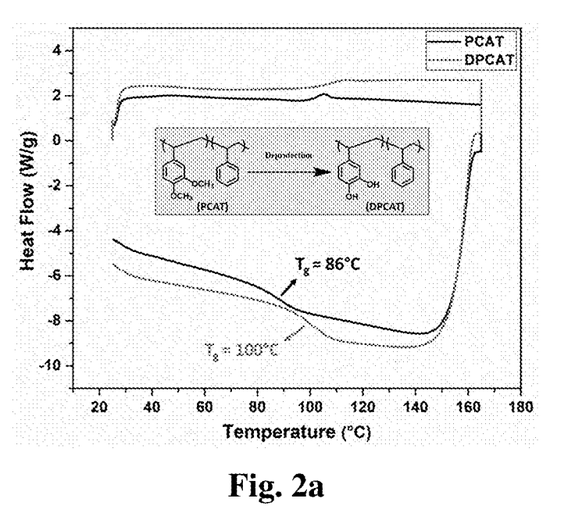
FIG. 2a shows a differential scanning calorimetry (DSC) thermogram of protected PCS represented by formula (PCAT) and deprotected PCS represented by formula (DP-CAT).
Figure 2B:
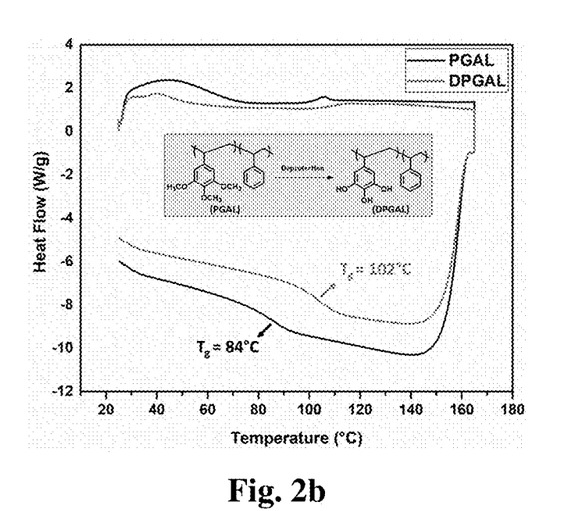
FIG. 2b shows a DSC thermogram of protected PGS represented by formula (P and deprotected PGS represented by formula (DPGAL).

Differential Scanning Calorimetry (DSC):

DSC was performed using a Perkin Elmer with a cooler and nitrogen gas purge. Each scan was programmed to run from −10 to 200° C. at 10° C./min and cooled from 200 to −10° C. at 40° C./min. The individual thermograms were used to calculate the glass transition temperature of each material. FIGS. 2a and 2b show the DSC thermograms of protected and deprotected catechol and gallol.

Bonding Strength in Both Dry and Under Seawater:

The adhesion strengths of biomimetic polymer adhesives were investigated by lap shear test both in dry and under seawater (FIGS. 3a, 3b, 4a, and 4b). Their bonding strengths were measured by employing them to bond together polished aluminium substrates by lap shear adhesion tests. The adhesion of each polymer in both dry and under seawater was examined without the addition of a cross-linking agent in order to directly compare the bonding strength of gallol-functionalized copolymers to that of catechol-functionalized copolymers. Their bonding strength were studied in dry and under seawater environments. Samples containing gallol groups exhibited greater bonding strength compared to the catechol-functionalized polymers. Two different copolymer samples were synthesized with different ratios of catechol and gallol-functionalized groups from methoxy-protected polymer.

The bonding strength of P(Cat16%-co-Sty84%), P(Gal16%-co-Sty84%), P(Cat16%-co-Sty84%) and P(Gal24%-co-Sty84%) were investigated under both dry and under seawater. Both under dry and seawater environments, with the 16% incorporation of catechol and gallol, it has been found that the gallol-containing polymer [P(Gal16%-co-Sty84%)] has better bonding strength compared to catechol-containing polymer [P(Cat16%-co-Sty84%)] (FIGS. 3a, 3b, 4a, and 4b). But with the 24% incorporation of catechol and gallol, it has been found that the gallol-containing polymer [P(Gal16%-co-Sty84%)] and catechol-containing polymer [P(Cat16%-co-Sty84%)] has similar kind of bond strength.

Bonding Strength on Different Substrates:

Bonding strengths were quantified on a variety of substrates, ranging from low energy to high energy. In general, high-energy surfaces are easier to stick with adhesives, and smooth plastics are challenging substrates for adhesion. PGS has been identified as a strong adhesive for being able to bind to polished aluminum (FIG. 5). Its adhesive performances on other substrates have been measured as well (FIG. 5). In addition to polished aluminium, ASTM aluminium, PVC, and PTFE were tested as substrates. These substrates exhibit a range of surface energies, roughness, and industrial applications. Pairs of each substrate were joined together using PGS. FIG. 5 shows the adhesive performance of PGS on the different substrates. Aluminium provided the strongest bonding strength for PGS because of the strong coordination between the surface and adhesives. PGS could stick to the substrates, including PVC and PTFE, under dry conditions.

Adhesion Strength Under Seawater for 28 Days

The bonding strength of P(Cat16%-co-Sty84%), P(Gal16%-co-Sty84%), P(Cat16%-co-Sty84%) and P(Gal24%-co-Sty84%) was investigated under seawater for 1 day, 3 days, 7 days and for 28 days respectively at room temperature. Bonding was strengthened as the cure time increased.

For P(Cat16%-co-Sty84%), when cured underwater for 1 day at room temperature, the bonding strength value is 0.2 MPa. As we cure for longer days, the bonding was strengthened. Higher adhesion strength at 1.2 MPa, 1.8 MPa, and 1.9 MPa were seen after 3 days, 7 days, and 28 days respectively.

For P(Gal16%-co-Sty84%), when cured underwater for 1 day at room temperature, the bonding strength value is 0.3 MPa. As the polymer cured for longer days, the bonding was strengthened. Higher adhesion strength at 1.1 MPa, 2.8 MPa, and 1.8 MPa were seen after 3 days, 7 days, and 28 days respectively.

For P(Cat 24%-co-Sty84%), when cured underwater for 1 day at room temperature, the bonding strength value is 0.3 MPa. As the polymer cured for longer days, the bonding was strengthened. Higher adhesion strength at 1.5 MPa, 2.2 MPa, and 1.8 MPa were seen after 3 days, 7 days, and 28 days respectively.

For P(Gal24%-co-Sty76%), when cured underwater for 1 day at room temperature, the bonding strength value is 0.3 MPa. As the polymer cured for longer days, the bonding was strengthened. Higher adhesion strength at 1.8 MPa, 2.1 MPa, and 1.5 MPa were seen after 3 days, 7 days, and 28 days respectively.

So, when the bonding strength between P(Cat16%-co-Sty84%), P(Gal16%-co-Sty84%) was compared, it has been found that the gallol-containing polymer [P(Gal16%-co-Sty84%)] has better bonding strength after 7 days compared to catechol-containing polymer [P(Cat16%-co-Sty84%)] (FIGS. 4a and 4b). But after 28 days it was seen that the decrease in adhesion strength for gallol-containing polymer, could be because of oxidation degradation under seawater. But with the 24% incorporation of catechol and gallol, it has been found that the gallol-containing polymer [P(Gal24%-co-Sty76%)] and catechol-containing polymer [P(Cat24%-co-Sty84%)] has a similar kind of bond strength (FIG. 4b).

Temperature Dependence Adhesion Study Towards ASTM Aluminium [poly(catechol-co-styrene) vs poly(gallol-co-styrene)] [PCS vs PGS]:

The effect of curing time on bonding strength (dry) was investigated. The bonding strength of PCS_16% in dry conditions decreased as the curing time proceeded and the highest bonding strength at 3.1 MPa was found at 55° C. A similar trend was observed for the PGS_16%.

As used herein, the following terms and phrases shall have the meanings set forth below. Unless defined otherwise, all technical and scientific terms used herein have the same meaning as commonly understood to one of ordinary skill in the art.

The term "about" can allow for a degree of variability in a value or range, for example, within 10%, within 5%, or within 1% of a stated value or of a stated limit of a range.

The term "substantially" can allow for a degree of variability in a value or range, for example, within 90%, within 95%, or within 99% of a stated value or of a stated limit of a range.

The terms "a," "an," or "the" are used to include one or more than one unless the context clearly dictates otherwise. The term "or" is used to refer to a nonexclusive "or" unless otherwise indicated. In addition, the phraseology or terminology employed herein, and not otherwise defined, is for the purpose of description only and not of limitation. Any use of section headings is intended to aid reading of the document and is not to be interpreted as limiting. Further, information that is relevant to a section heading may occur within or outside of that particular section. The terms "including" and "having" are defined as comprising (i.e., open language).

Those skilled in the art will recognize that numerous modifications can be made to the specific implementations described above. The implementations should not be limited to the particular limitations described. Other implementations may be possible.

It is intended that the scope of the present methods and apparatuses be defined by the following claims. However, it must be understood that this disclosure may be practiced otherwise than is specifically explained and illustrated without departing from its spirit or scope. It should be understood by those skilled in the art that various alternatives to the embodiments described herein may be employed in practicing the claims without departing from the spirit and scope as defined in the following claims.

We claim:

1. A method of manufacturing a gallol-containing polymer adhesive, the method comprising the steps:
    (i) mixing a dispersant and a surfactant in the presence of a solvent;
    (ii) mixing a styrene monomer with 3,4,5-trialkoxy styrene monomer;
    (iii) adding an initiator to the mixture of monomers of step (ii);
    (iv) adding the initiator-monomer mixture of step (iii) to the mixture of step (i) to form monomer droplets;
    (v) allowing a polymerization reaction in the monomer droplets under continuous stirring;
    (vi) quenching the polymerization reaction to obtain 3,4, 5-trialkoxy styrene-co-styrene; and
    (vii) hydrolyzing the 3,4,5-trialkoxy styrene-co-styrene to obtain the gallol-containing polymer.

2. The method of claim 1, wherein the alkoxy group is methoxy, ethoxy, or silyloxy.

3. The method of claim 1, wherein the dispersant and the surfactant can be used in a ratio of about 2%:4% to about 4%:2%.

4. The method of claim 1, wherein the solvent is water.

5. The method of claim 1, wherein the dispersants are selected from polyvinyl alcohol (PVA), modified PVA, polyvinylpyrrolidine (PVP), and hydroxylpropylmethyl cellulose.

6. The method of claim 5, wherein the dispersant is PVA.

7. The method of claim 1, wherein the surfactant is sodium dodecyl sulfate.

8. The method of claim 1, wherein the initiator is selected from dibenzoyl peroxide (BPO), tert-butyl peroxide, diacetyl peroxide, lauroyl peroxide, dicumyl peroxide, 2,2'-azobisizobutyronitrile (AIBN), 2,2'-azobis(2-methylpropionitrile), 2,2'-azobis(2-methyl butyronitrile), or a combination of two or more thereof.

9. The method of claim 8, wherein the initiator is BPO or AIBN.

* * * * *